Figure 1:
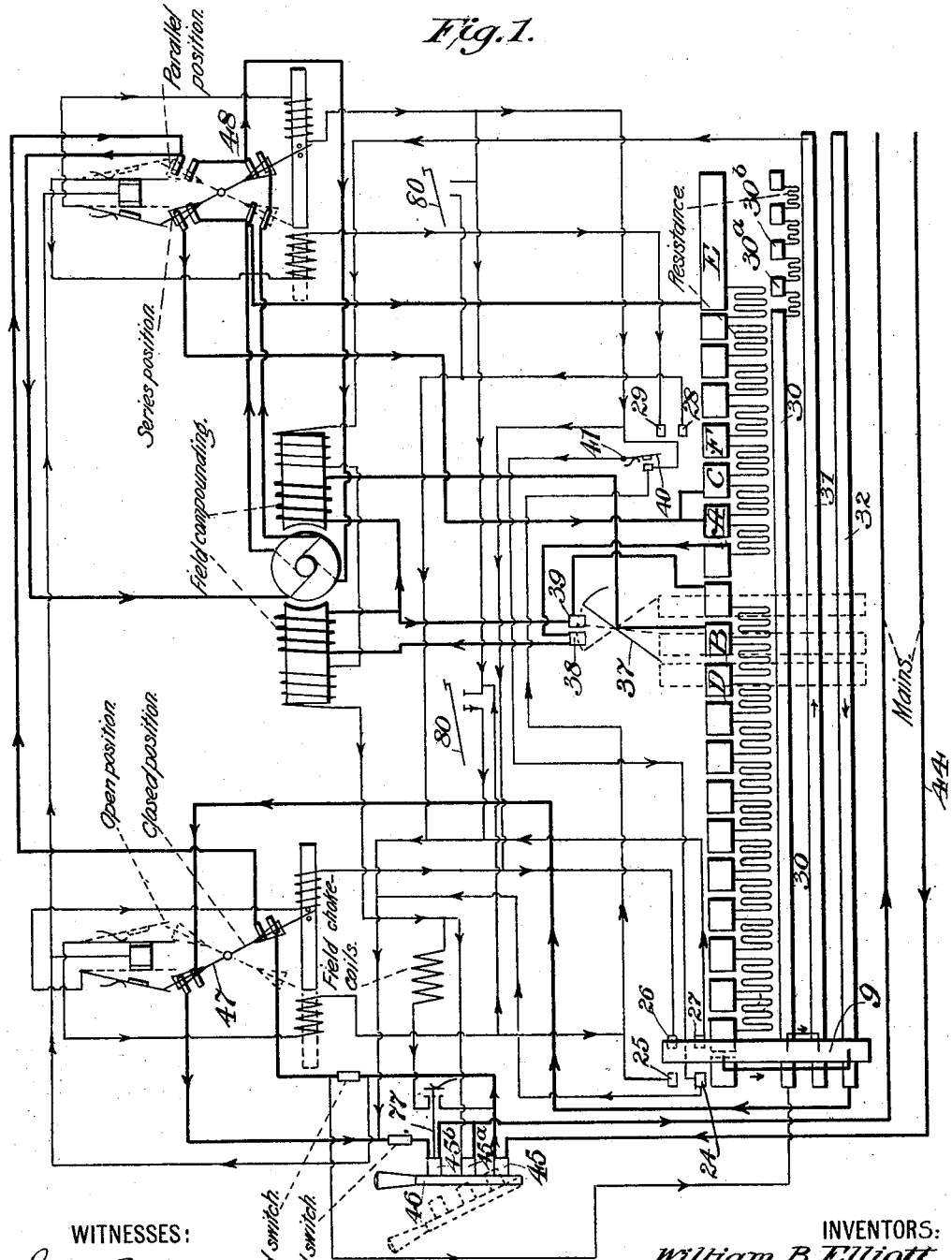

No. 654,883. Patented July 31, 1900.
W. B. ELLIOTT & J. W. ESKHOLME.
MOTOR CONTROLLER.
(Application filed Apr. 2, 1900.)
(No Model.) 5 Sheets—Sheet 1.

WITNESSES:

INVENTORS:
William B. Elliott,
John W. Eskholme.
BY
ATTORNEY

No. 654,883. Patented July 31, 1900.
W. B. ELLIOTT & J. W. ESKHOLME.
MOTOR CONTROLLER.
(Application filed Apr. 2, 1900.)

(No Model.) 5 Sheets—Sheet 2.

WITNESSES:

INVENTORS:
William B. Elliott.
John W. Eskholme.
BY
ATTORNEY

No. 654,883. Patented July 31, 1900.
W. B. ELLIOTT & J. W. ESKHOLME.
MOTOR CONTROLLER.
(Application filed Apr. 2, 1900.)
(No Model.) 5 Sheets—Sheet 3.
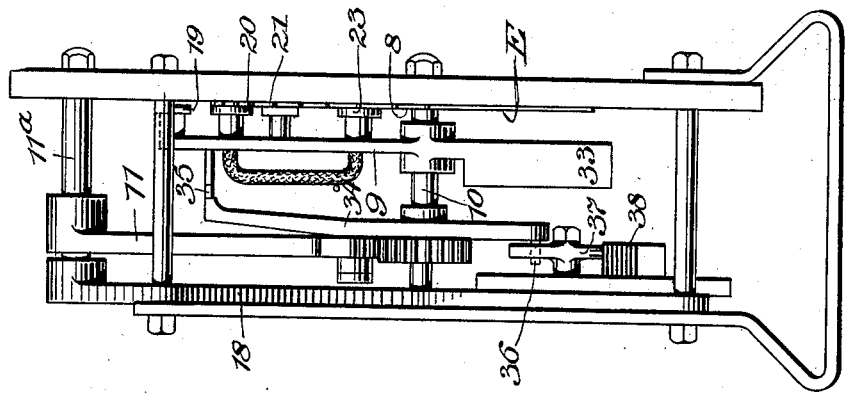
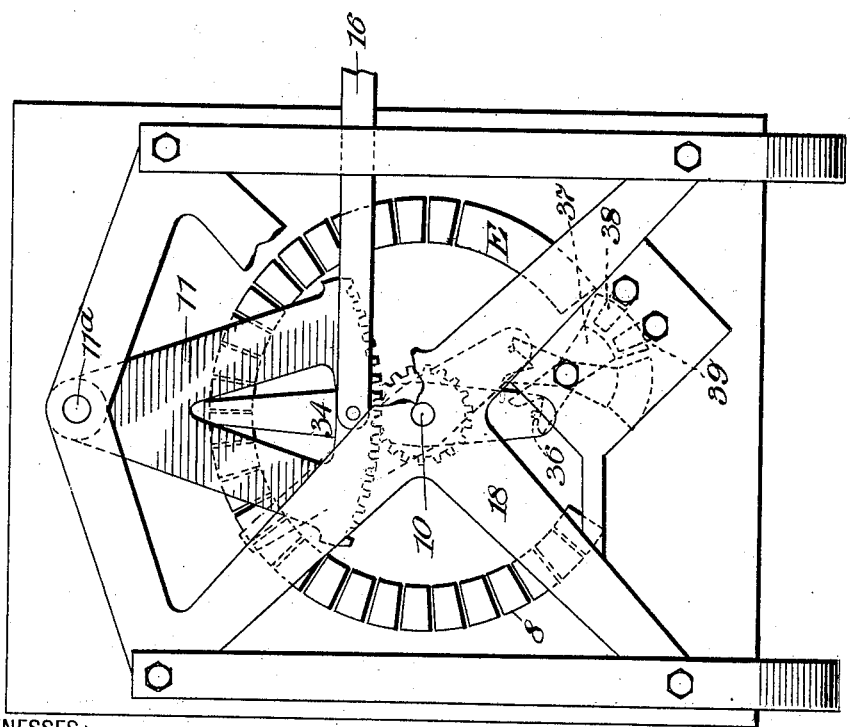
WITNESSES:
George T. Hackley
Emma R. Newell
INVENTORS:
William B. Elliott,
John W. Eskholme.
BY
ATTORNEY No. 654,883. Patented July 31, 1900.
W. B. ELLIOTT & J. W. ESKHOLME.
MOTOR CONTROLLER.
(Application filed Apr. 2, 1900.)
(No Model.) 5 Sheets—Sheet 4.

WITNESSES:

INVENTORS:
William B. Elliott,
John W. Eskholme.
ATTORNEY

No. 654,883. Patented July 31, 1900.
W. B. ELLIOTT & J. W. ESKHOLME.
MOTOR CONTROLLER.
(Application filed Apr. 2, 1900.)
(No Model.) 5 Sheets—Sheet 5.
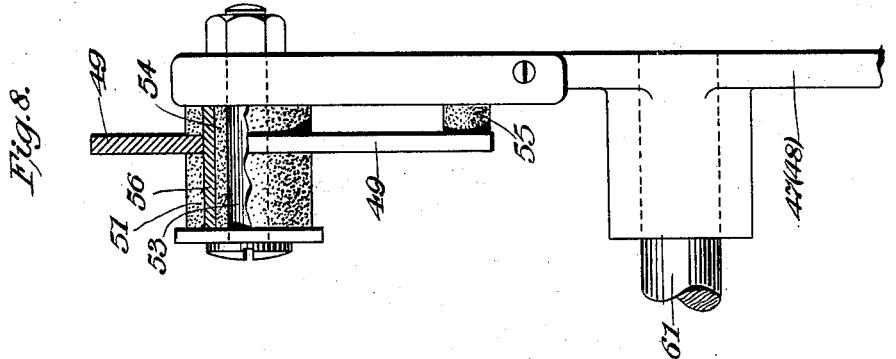
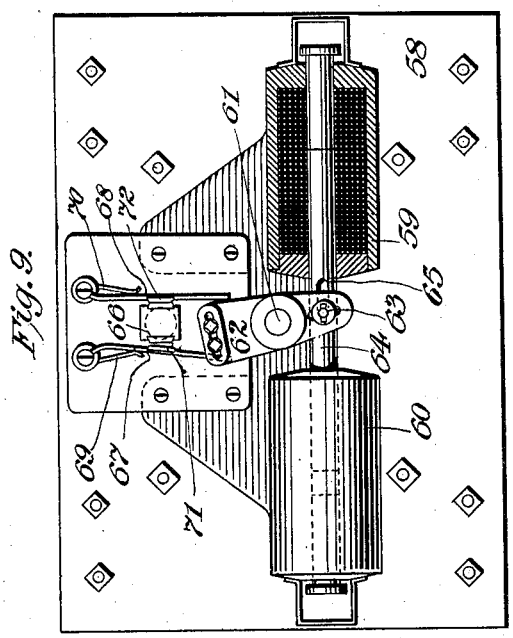
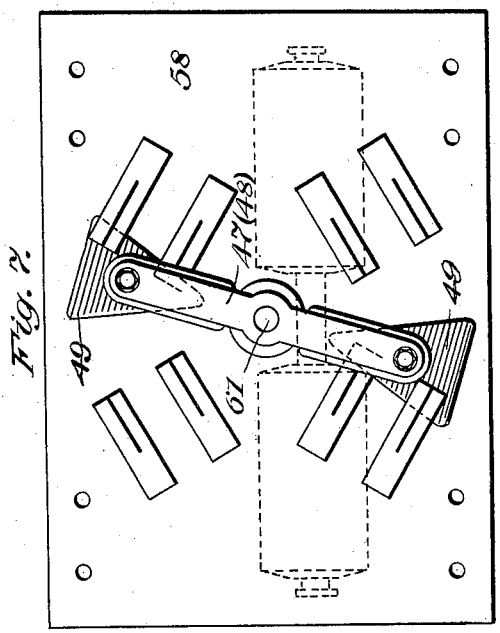
WITNESSES:
INVENTORS:
William B. Elliott,
John W. Eskholme.
BY
ATTORNEY

UNITED STATES PATENT OFFICE.

WILLIAM BREWSTER ELLIOTT AND JOHN WILLIAM ESKHOLME, OF WESTFIELD, NEW JERSEY, ASSIGNORS TO THE C. & C. ELECTRIC COMPANY, OF NEW JERSEY.

MOTOR-CONTROLLER.

SPECIFICATION forming part of Letters Patent No. 654,883, dated July 31, 1900.

Application filed April 2, 1900. Serial No. 11,037. (No model.)

*To all whom it may concern:*

Be it known that we, WILLIAM BREWSTER ELLIOTT and JOHN WILLIAM ESKHOLME, citizens of the United States, residing at Westfield, New Jersey, have invented certain new and useful Improvements in Motor-Controllers, of which the following is a full, clear, and exact description.

Our invention relates to a new and improved apparatus for controlling the speed of, preferably, a motor having a plurality of independent windings; and one of our objects is to provide a device whereby this motor may be started at an extremely-slow speed having great torque and the speed gradually increased as desired, preferably by means of a single hand-lever.

Our invention is particularly applicable for use with printing-presses which are driven by an electromotor directly connected or geared to the press. One difficulty heretofore experienced in the operation of large printing-presses particularly by such a motor has been due to the difficulty of obtaining a slow enough and at the same time a steady motion to enable the pressman to properly feed the paper through the rolls at starting and of increasing the speed to the full desired speed without any jerks. Should jerks occur in starting the motor or in changing the speed, the paper which is running through the press would be extremely liable to be broken, entailing considerable loss of time and expense. By our construction we have avoided these objections, and in the embodiment shown in the drawings a single hand-lever is provided, by the movement of which in one direction the motor may be started at any speed desired and this speed be gradually and steadily increased without any jerks to full speed by a continued movement of the lever in the same direction. By a reverse movement of the lever the motor may be gradually and steadily slowed down. The hand-lever is preferably located close to the press, and one pressman can therefore completely control the running of the press by a simple movement of this one lever in one direction or the other and at the same time attend to other duties, such as adjusting the tension on the paper-roll. The connection from this lever to the parts controlled by it may be either mechanical or electrical.

In using a motor or motors with printing-presses if there are enough turns in the armature-winding to produce the necessary torque at starting the motor will probably spark when rotating at its full speed, and, on the other hand, if the armature is used with few enough turns to prevent sparking at full speed the current necessary to start the rotation of the armature must be comparatively great, as the torque depends on the ampere-turns on the armature. To overcome this objection, we have preferably provided what we have called herein a "plurality of armature-windings" and means for controlling these windings. This motor in this embodiment is made up of two separate armature-windings and commutators mounted on the same core and shaft; but we do not desire to be limited to this construction, as we are aware that two independently-rotatable windings could be used, such as two independent motor-armatures, and yet the windings be connected the same as in the present method of control, and we use the word "motor" with this broad meaning. If these windings are connected in series when the machine is started, sufficient ampere-turns will be provided to start the machine without a great amount of current, and if the windings are thrown from series into parallel before the machine reaches its full speed, preferably at half-speed, there will be no sparking at the commutators at full speed, as there otherwise would be.

Figure 2:
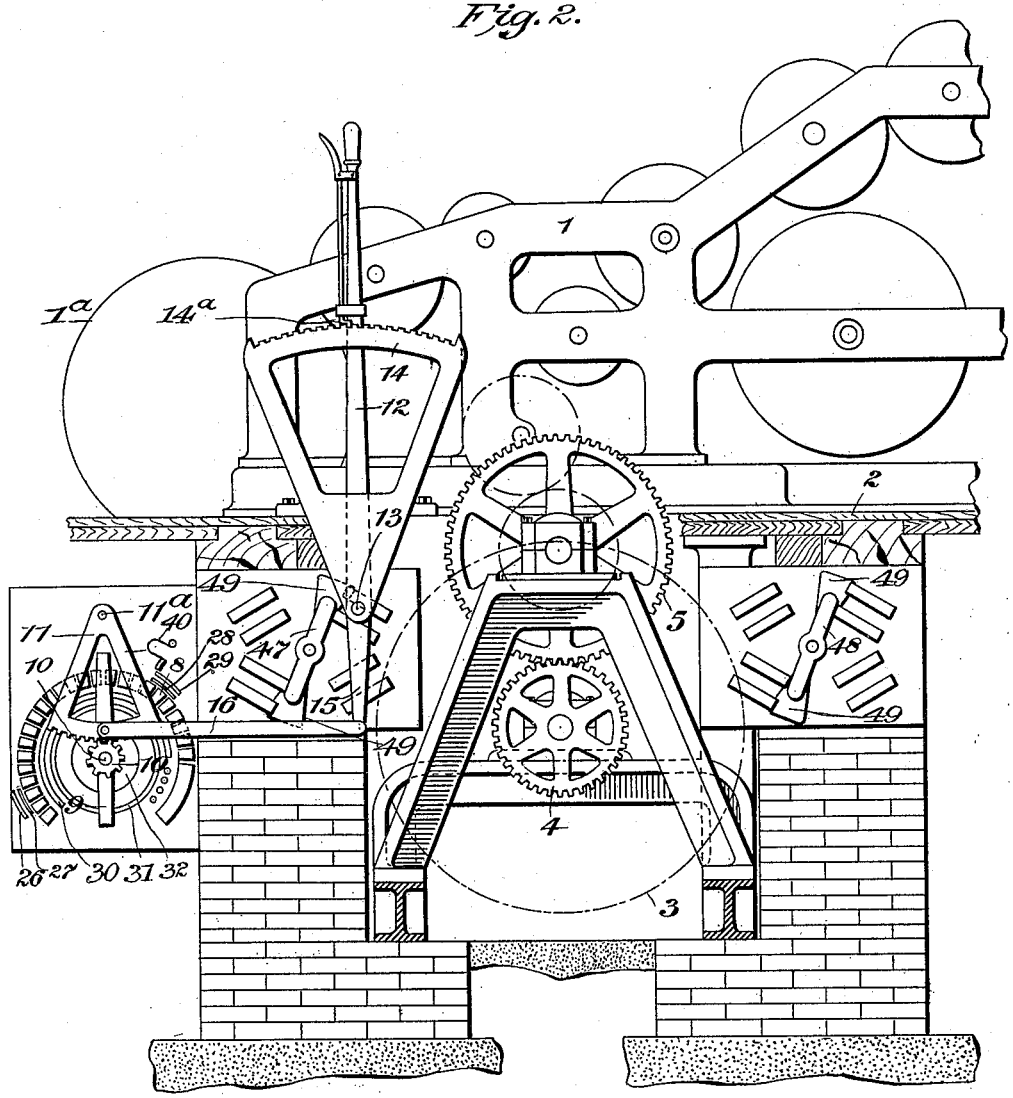
Figure 6:
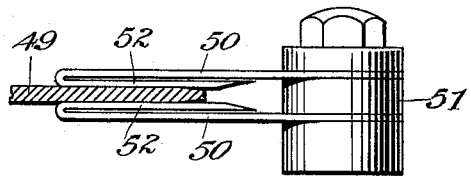
Figure 10:
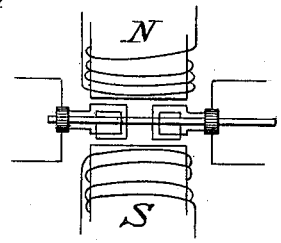
Figure 5:
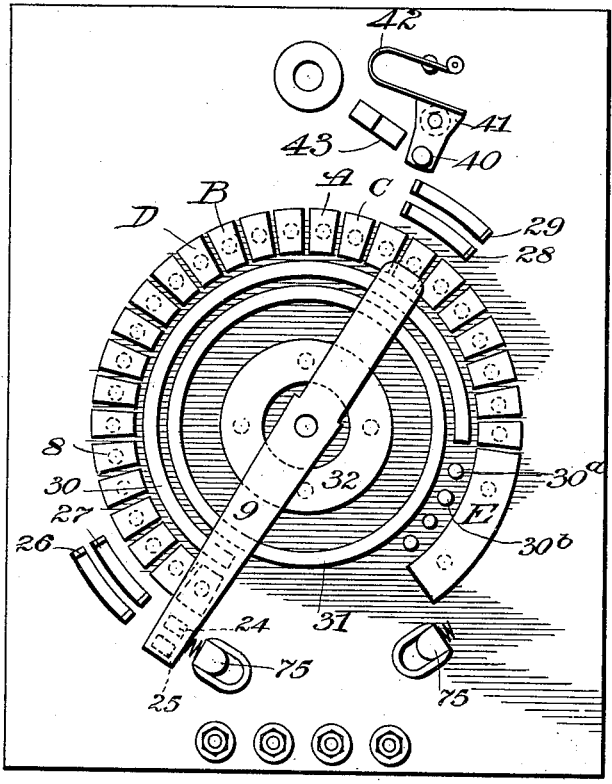

In the preferred embodiment of our invention shown in the drawings, Figure 1 is a diagram of the connections. Fig. 2 is a side elevation of part of the printing-press, showing the hand-lever, two of the switches in the main circuit, the terminal arc, and the controlling-lever contacting with these terminals. Fig. 3 shows more detailed view of the controlling-lever and connections thereto. Fig. 4 is a side elevation of Fig. 3. Fig. 5 is a detailed view of the terminal arc, the stationary contact-strips, and the controlling-lever. Fig. 6 is a detailed view of the spring-contacts on the main switches. Fig. 7 is an enlarged view of the switch lever and blades in the armature-circuit. Fig. 8 is a detail showing the method of mounting and insulating the switch-blades in these main switches. Fig. 9 is a detailed view of the magnets and other parts for actuating the main switches. Fig. 10 is a diagrammatic view showing the two armature-windings and commutators on the same shaft.

In the above preferred embodiment of our invention we have provided a pair of armature-windings on the same core and shaft, each of which windings is provided with a separate commutator on said shaft and a multipolar shunt or compound-wound field-magnet surrounding these two windings. To control this motor, we have provided different connections and resistances, and preferably a single controlling-lever, to make the different connections. We have preferably arranged the terminals in the form of a circle or the arc of a circle, as seen in Fig. 5, and pivoted in the center the controlling-lever, (shown in detail in Figs. 3 and 4,) and have connected this controlling-lever with a hand-lever, so that by the movement of the hand-lever in one direction one switch in the armature-circuit is thrown to close the circuit through the windings, which should then be in series. If the windings are then in parallel, a switch will be thrown at the same time and connect them in series. By a further movement of the hand-lever in the same direction a series of resistances are in succession cut out of the armature-circuit. The field may be weakened, preferably, by short-circuiting a part of the series compounding, the series compounding being of high-resistance material when cut out also decreases the resistance in series with the armature-windings, and by a further movement of the hand-lever in the same direction the armatures are thrown into parallel and at the same time a substantially compensating resistance is introduced into the armature-circuit, and by a further forward movement of the hand-lever some of this resistance is cut out. We have also provided a series of resistances in the shunt-field winding, which may be introduced by a further movement of the hand-lever in the same direction to further weaken the field and still further increase the speed of the motor. By a reverse movement of the hand-lever these shunt-field resistances are successively cut out. Then a series of resistances are introduced into the armature-circuit, and on a further backward movement of the hand-lever the armature-circuit is opened, and in this embodiment the windings are thrown from parallel into series, preferably at the same time.

As seen in Fig. 2, 1 represents the printing-press; 1ª, the paper-feed roll; 2, the floor on which the printing-press is mounted; 3, the motor in outline, and 4 a gear carried by the armature-shaft engaging with a gear 5, which drives the press. 47 and 48 are two switches in the main circuit. 8 is a terminal arc which is passed over by the preferably-pivoted sliding controlling-lever 9 to automatically make different connections. 10 is a toothed wheel carried by the shaft upon which the lever 9 is mounted, and 11 is a toothed segment engaging with the wheel 10 and pivoted at 11ª. 12 is the hand-lever, pivoted at 13 and having a safety-catch 14ª engaging a stationary toothed segment 14. The lower arm 15 of the hand-lever is connected with the toothed segment 11 by a link 16. All the parts of the mechanism, except the hand-lever 12 and toothed segment 14, are preferably below the floor, thus being out of the way and allowing the pressman to control the press merely by moving the hand-lever in one direction or the other.

Referring to Figs. 3 and 4, which show details of the controlling-lever 9 and other parts connected therewith, the controlling-lever 9 is fixed to the shaft 10, which is rotatable in a suitable frame 18 and carries contact-blocks 19, 20, 21, and 23. The contact-block 19 contacts with and makes electrical connection between the terminals 24 25 26 27 and 28 29. (See Fig. 5.) The block 20 contacts with and bridges the terminal blocks of the arc 8, which are insulated from each other, with the exception of suitable resistance-coils. Block 21 bridges the stationary terminal strips 30 and 31 and block 23 contacts with circular terminal strip 32. 33, Fig. 4, is a counterweight on this controlling-lever. Fixed to the shaft 10 is a second lever 34, which is attached at one end by the connection 35 to the lever 9 and at the other end carries a pin 36, which engages with the forked end of a contact-switch 37, which passes across and bridges contact-points 38 and 39 on the frame 18. As the lever 9, Fig. 5, rotates from left to right it strikes a pin 40 on a metallic switch portion 41, carried by a spring 42, and pushes the same to the right. On the return of the lever from right to left the end of the lever strikes the pin 40 on the opposite side and pushes said contact portion 41 to the left into engagement with the other switch-terminal 43.

The diagram shown in Fig. 1 is laid out as though the contact segments and rings shown in Fig. 5 had been bent up into parallel straight lines. The current enters by the main 44 and passes up through the switch-blade 45 of the three-pole switch 46, which will be hereinafter described, from thence through an overload switch to one terminal of the main switch 47. This switch is shown in diagram in the open position by dotted lines and in its closed position by full lines. The controlling-lever 9 is shown as moved from its position of rest in Fig. 5 a short distance toward the right until it touches the contact-points 26 and 27.

To throw the main switches 47 and 48, Fig. 1, we have provided two pairs of electromagnets preferably in the form of solenoids, which are energized when the lever 9 bridges certain contact-points. In this embodiment we have provided a device to open the circuit through the solenoid which has thrown the switch 47 (or 48) as soon as the switch-blade leaves its terminal. Details of the main switches 47 and 48 are shown in Figs. 6, 7, and 8. To provide a reliable contact for the switch-blade 49, we have provided, preferably, a pair of contact-springs, Fig. 6, made of spring-copper, and these springs preferably consist of a main portion 50 50, suitably fixed to a post or standard 51, the ends 52 52 of which are turned over upon the main portion and lie between the main portion 50 50 and are engaged by the switch-blade when thrust therein. In this way we have provided a contact part which has a double spring. The outer or main portion of the contact-spring will be forced outwardly, and if these were all the spring-jaws that were provided the main blade when it entered between the jaws would not contact with the same for the entire length of the jaws, as the same would be bent outward and form a sort of V-shaped opening. In the present construction, however, although the outer portion 50 of the jaws may be bent outward slightly, the inner or turned-over portion 52 can spring in the opposite direction, because it is slightly separated from the main portion, and thus make a sure contact with the entire portion of the switch-blade which has entered between the jaws.

The switch-blades 49 are preferably insulated from the switch-lever 47 48. A detail of a blade is shown in Fig. 8. The switch-lever 47 (48) carries at the end a pin 53, which pin enters a hole in the blade, and this pin is surrounded by an insulation-cushion 54. One end of the lever is attached to an insulated cushion 55 to steady the same. It will be obvious that if the switch-blade 49 directly contacted with the cushion or insulation 54 the repeated blows which the edges of the aperture in the blade would give the cushion 54 would soon cut through the same and probably ground the circuit on the pin 53. To protect this insulation and to distribute the force of the blow over a considerable surface of the same, we have provided a sleeve 56, preferably made of brass, which may surround this insulation 54. 57 is a further insulating-cushion to hold the blade 49 in place, but allowing slight movement of the same to accommodate itself to the spring-jaws.

One of the pair of magnets—in this case solenoids—which we have provided to throw the switches 47 and 48 is shown in detail in Fig. 9 and in outline in Fig. 7. The switches 47 and 48 are preferably mounted on slate-boards 58, and on the back of these boards (see Fig. 7) are mounted the solenoids 59 and 60. These solenoids are preferably ironclad to form a more complete path for the magnetic lines and oppositely situated. The shaft 61, upon which the lever 47 (48) is mounted, passes through the board 58 and carries on the inner end thereof a second lever 62, and the lower end of this lever 62 carries a pin 63. 64 is a core for the solenoids, which we may designate an "armature" for the magnet formed by the solenoid. It will be obvious that to throw the switch 47 more power will be required at the first part of this movement than at the last, because the switch-blade 49 must be pulled out of the contact-jaws. The solenoid, however, operates with the least effect on the core at the beginning. To increase this initial pull on the core, we have therefore provided an auxiliary core, preferably movable, to increase the number of magnetic lines, which auxiliary core is intended to normally stand at a slight distance from the end of the core 64, as shown in dotted lines at the left in Fig. 9. When the solenoid 60 is energized, the auxiliary core therein will be drawn inward toward the right and will increase the number of magnetic lines within the solenoid, and as the space between the end of the auxiliary core and the end of the core 64 is comparatively slight the solenoid will operate with increased force upon the core 64 and draw the same quickly to the left. The auxiliary core, however, being movable, is pushed out of the way by core 64, thus allowing core 64 to traverse its full distance.

To provide an additional aid to the mere strength of the solenoid in pulling out the switch-blade 49 from the contact-jaws, we have provided means to strike a quick hammer-blow against the pin 63, and thus insure a quick movement of the switch-lever. To accomplish this object, we have provided an abutment on the core 64 which shall strike the pin 63, which pin is connected through lever 62 and shaft 61 with the movable switch-lever 47, and in this embodiment of our invention this abutment is formed by the end of a slot 65 in the core into which the pin 63 passes. It will be obvious that if the solenoid 60 is energized the core 64 will be quickly drawn to the left, and the end of the slot 65 coming in contact with the pin 63 will suddenly strike the lever 62, and consequently jerk switch-lever 47 over into its opposite position. It is not necessary that the solenoid should act with a pull upon the switch-lever 47 after the blade 49 has left the contact-jaws, because the momentum of the lever 47 will then be sufficient to carry it across and into the opposite pairs of contact-jaws. We therefore have provided a means to automatically open the closed solenoid-circuit on the movement of the core.

66 is a stationary contact-block, preferably made of carbon, which forms one terminal of the electric circuits for energizing the solenoids. This circuit, as shown in diagram in Fig. 1, may be a shunt from the main circuit.

67 and 68 are pivoted metallic switch-arms provided with springs 69 70, tending to push the arms toward the contact-block 66. Each of these switch-arms may carry a carbon block 71 72, which contacts with the block 66. The ends of the arms 67 68 stand in the path of pins on the end of the lever 62, so that on the movement of this lever sufficient to carry the blades 49 out of the contact-jaws one arm or the other will be moved away from the block 66. The arm 67 forms part of a circuit from the block 66 through the solenoid 59, so that when said arm is moved away from the block 66 the circuit through this solenoid is broken. The contact-block on the arm 67 then comes in contact with the block 66; but although this arm 67 is electrically connected with said shunt-circuit through the solenoid 60, as shown in Fig. 1, said solenoid 60 is not immediately energized, as will be explained hereinafter.

When we speak of a "pair" of electric circuits, we do not mean necessarily that there must be separate wires for the two circuits, because we consider that in some cases if a current should be sent through a translating device, such as a solenoid, in one direction it would constitute one circuit, and if then the current was reversed the same might act as and give the results of another circuit, and when we say that a circuit includes as a part thereof one of the solenoids we do not mean that both may not be included in it.

To allow a considerable movement of the long core and yet to leave only a comparatively-short space between the ends of it and the auxiliary core, we have in the embodiment illustrated made the auxiliary core just long enough, so that when the arm 67 (or 68) has broken contact with block 66 the end of the long core will strike the movable core. As the auxiliary core is movable, it will be pushed from its position and will thus destroy some of the inertia of the long core and tend to bring it to a standstill. By this arrangement we provide for a very slight clearance between the ends of the two cores (thus strengthening the initial pull on the long core more than would be the case with a greater clearance between the cores) and yet allow a greater movement of the long core than would be possible if the auxiliary core were stationary. This is the preferable construction; but of course the auxiliary core might be stationary.

Referring now to Figs. 1 and 5, it will be seen that when the lever 9 is moved from its position shown in Fig. 5 to the position shown in Fig. 1, in which the block 19 bridges the solenoid-terminals 26 27, a circuit will then be closed through the arm then in contact with said block 66, as shown in Fig. 1 in dotted lines at the left of said block, down through the solenoid at the right of the lever 47 to the contact-terminal 26, Fig. 5, through the contact-block 19 on the lever 9 to terminal 27, and from there, as shown in Fig. 1, back to the main circuit. This will energize solenoid 59, throwing the lever 47 from the open position shown in Fig. 7 and in dotted lines, Fig. 1, to the closed position shown in full lines in said Fig. 1. The current from the main will then pass through the blade 49 at the lower end of the lever 47 over to one of the contact-jaws at the upper end of the lever 48, to and through one armature-winding, through the contact-blade at the lower end of the lever 48, to and through the other armature-winding, from thence to one of the contact-jaws at the upper end of the lever 48, through the blade at the upper end of said lever down to the terminal A, thence through a resistance-coil to the next contact-block, and from there through the series compounding of the field-magnet back to terminal B, and thence by way of the successive resistance-coils between the terminal-blocks of arc 8 to the controlling-lever 9 by way of contact-block 20, Fig. 4, thence by way of cable 73 to the contact-strip 32, Fig. 5, and from there back to the return-main. It will be observed from the connections, Fig. 1, through the solenoid at the right of the lever 48 that if the lever should happen to be in the "parallel" position at this time it will be thrown back to the "series" position. As the lever 9 is moved from left to right in either Fig. 1 or Fig. 5 it will be observed that the resistances in the armature-circuit, which are located between the different blocks of the arc 8, will be gradually cut out. These resistances are preferably greater between the blocks at the left of the arc than at the right, and they can be so proportioned that the motor will barely turn when the controlling-lever 9 is in the position shown in full lines in Fig. 1. As the lever is moved to the right these resistances will be successively cut out and the armature will therefore rotate faster. As the controlling-lever 9 comes into contact with block D, Fig. 1, it strikes a switch-lever 37 (see Fig. 3) and moves the same into contact with the terminal 39. This reduces the strength of the field, preferably by short-circuiting a part of the series-field compounding, thus cutting out the ohmic resistance of this winding and also cutting down the magnetic lines in the field and allowing the armature to rotate faster. As the controlling-lever 9 moves farther to the right the lever 37 contacts with both the terminals 39 and 38 and short-circuits another part, which may be the rest, if desired, of the field compounding, thus further increasing the speed of the motor, and the amounts so short-circuited can be so proportioned that no jerk from the increase of speed will result. As the controlling-lever moves to the right more resistance will be cut out and the lever will strike the spring-contact 41 and merely push the same to one side, but will not close the circuit at this point. As the lever 9 moves off from the terminal C, Fig. 1, it contacts with the terminals 28 29, closing the circuit through the solenoid at the left of the switch-lever 48, drawing the core to the left and throwing the switch 48 over into the opposite pair of jaws. The armature-circuit will then be through the windings in parallel, and instead of entering the line of contacts at A or C it will enter at E. In switching any armature-windings from series to parallel the resistance of the armature-circuit is reduced, and therefore in this case there would be a sudden rush of current through the windings, which would tend to drag the armatures quickly up to the new speed, and this would result in a quick jerk on the printing-press if some means for preventing this were not provided. Any quick jerk in changing from one manner of connection to the other is a serious matter in the running of printing-presses, for in all probability the paper running through the press would be broken. Between the contact-block F and the block E where the current then enters is a series of resistances which in the aggregate are substantially sufficient to compensate for the decreased resistance through the windings in their parallel connection and is preferably just enough so that the armature will rotate slightly faster when the change is made from the series to the parallel connection; but the difference should not be so great as to make any jerk. As the lever 9 moves to the right some of this additional resistance is cut out, and the speed of rotation of the armature will therefore further increase. The contact-strip 30 is a part of the shunt field-circuit. This shunt field-circuit in the present embodiment remains the same until the controlling-lever 9 strikes the contact-block E. The segment 30 is there divided into several contact-blocks $30^a$ $30^b$, &c., which are insulated from each other, but are connected by a series of resistances. As the lever moves to the right over the contact-block E it will cut these resistances into the shunt field-circuit in succession and weaken by so much the field of the motors, and therefore further increase the speed. 75 75 are spring-stops to limit the movement of the lever 9. The lever 9 is now at the end of its forward stroke and the hand-lever 12 is also at the end of its traverse in one direction. As the hand-lever 12 moves in the reverse direction the controlling-lever will also move backward, and the resistance between the blocks $30^a$ $30^b$, &c., will be successively cut out, thus increasing the strength of the field and reducing the speed of rotation of the armatures, and as the hand-lever moves to the left, off from the contact-block E and over the other blocks, resistances will be introduced in succession into the armature-circuit and will therefore further reduce the speed of the motor. When the controlling-lever 9 strikes the pin 40 on the movable contact-piece 41, it will push the piece 41 to the left (see Fig. 5) until it strikes the contact-piece 43. This will close the circuit through the right-hand solenoid of the switch 48 and through the left-hand solenoid of the lever 47, Fig. 1, thus opening the armature-circuit and preferably throwing the windings back into series at the same time. As the controlling-lever moves farther to the left it will strike the switch-lever 37 and move the same off from contact with terminals 38 and 39.

When the lever reaches the position shown in Fig. 1 in full lines, it will close the circuit through the right-hand solenoid of the switch 47, thus closing the circuit through the armature-windings, which are again in series. The pressman may therefore, by motion of the hand-lever 12 in one direction, start his press at the slowest speed desired and steadily increase the speed without any jerk up to the full speed of the windings in parallel and by a movement of the hand-lever in the reverse direction reduce the speed until the windings are thrown from parallel back to series, when the entire current will be cut off from the armature-circuit, and all the pressman has to do to reduce the speed gradually from this point is to quickly draw back the hand-lever to the position shown in Fig. 1 and then move it forward again until he meets the speed of the motor, which is of course beginning to run slower. If he desires to stop the motor, no matter in what position the lever is all he needs to do is to bring the controlling-lever 9 back to the position shown in Fig. 5 by moving the hand-lever to the end of its traverse, when the contacts 24 35 will be bridged and the switch 47 thrown into the open position. To stop the press suddenly—for instance, when there is not time to reach the hand-lever—we have provided a plurality of emergency-switches—such as 80, Fig. 1—located at different points around the press, which switches may be in the floor, as foot-switches or otherwise, which will connect the right-hand solenoid of switch 48 and the left-hand solenoid of switch 47, preferably in parallel, thus opening the armature-circuit and at the same time throwing the armature-windings back to the series connection.

Referring to the hand-switch 46 at the left of Fig. 1, it will be seen that the three contact-blades 45 $45^a$ $45^b$ will successively close the terminals which lead to them. In this way practically three successively-operating switches are provided by one movement. When the switch-blade 45 touches its terminals, the armature-circuit is closed as far as switch 47, allowing the electromotive force from the entering-main to be impressed upon the lower terminal of the switch 47 and also upon the shunt field-circuit. On the further movement of the switch-lever 46 the blade $45^a$ will close the other terminal of the shunt field-circuit, thus completing it, and when the switch 46 is thrown to its final closed position the blade $45^b$ will close the path from the upper terminal of the switch 47 to the return-main. When the switch 46 is opened, the circuit through the field-shunt is opened and a return-current powerful enough to break down the insulation might result, and we therefore have short-circuited this field-shunt through a safety-resistance, which in the present embodiment is represented in Fig. 1 by field choke-coils. In order to close this field shunt-circuit through this safety-resistance, preferably just before or substantially at the same time as the circuit is broken by the switch 46, we have provided a push-switch 77, Fig. 1, which is engaged by the blade 45ᵇ of the switch 46, so that when the switch 46 is closed the shunt-circuit through the choke-coils is opened; but just before or at the same time as that shunt field-circuit is opened by means of switch 46 a spring presses the push-contact 77 into engagement with suitable terminals which close the field shunt-circuit through this safety-resistance.

When we speak of a "hand-lever," we do not mean necessarily that it must be a straight lever, as shown in the present embodiment, because a hand-wheel or other analogous device might answer nearly as well and could, in fact, accomplish many of the advantages of the embodiment shown in the drawings. We are aware, further, that very many changes may be made in the construction herein disclosed without departing from the spirit of our invention, and we do not therefore desire to limit ourselves to the particular embodiment herein shown and described.

What we claim is—

1. In combination, a plurality of armature-windings, a hand-lever, means operated by the movement of said lever in one direction to connect said windings in series, a series of resistances in the armature-circuit, means connected with said lever and adapted on the movement of said lever in one direction to cut out in succession some of said resistances, a switch connected with said lever and operated by a further movement of said lever in the same direction to throw said windings into parallel and at the same time introduce into said circuit a series of substantially compensating resistances, and means connected with said lever and operated by a further movement of said lever in the same direction to cut out in succession some of said latter resistances.

2. In combination, a plurality of armature-windings, means to connect the same in series, a hand-lever, a series of resistances in the armature-circuit, means connected with said lever and adapted on the movement of said lever in one direction to cut out in succession some of said resistances, means operated by the further movement of said lever in the same direction to reduce the strength of the field, a switch connected with said lever and operated by a further movement of said lever in the same direction to throw said windings into parallel and at the same time introduce into said circuit a series of substantially compensating resistances, and means connected with said lever and operated by a further movement of said lever in the same direction to cut out in succession some of said latter resistances.

3. In combination, a plurality of armature-windings, a series of resistances in the armature-circuit, means connected with said lever and adapted on the movement of said lever in one direction to cut out in succession some of said resistances, means operated by the further movement of said lever in the same direction to cut out some of the field-coils to thereby reduce the strength of the field, a switch connected with said lever and operated by a further movement of said lever in the same direction to throw said windings into parallel and at the same time introduce into said circuit a series of substantially compensating resistances, and means connected with said lever and operated by a further movement of said lever in the same direction to cut out in succession some of said latter resistances.

4. In combination, a compound-wound field-magnet, a plurality of armature-windings, a hand-lever, a series of resistances in the armature-circuit, means connected with said lever and adapted on the movement of said lever in one direction to cut out in succession some of said resistances, means operated by the further movement of said lever in the same direction to cut out some of the series field-coils to thereby reduce the strength of the field, a switch connected with said lever and operated by a further movement of said lever in the same direction to throw said windings into parallel and at the same time introduce into said circuit a series of substantially compensating resistances, and means connected with said lever and operated by the further movement of said lever in the same direction to cut out in succession some of said latter resistances.

5. In combination, a compound-wound field-magnet, a plurality of armature-windings, a hand-lever, a series of resistances in the armature-circuit, means connected with said lever and adapted on the movement of said lever in one direction to cut out in succession some of said resistances, means operated by the further movement of said lever in the same direction to cut out some of the series field-coils to thereby reduce the strength of the field, a switch connected with said lever and operated by a further movement of said lever in the same direction to throw said windings into parallel and at the same time introduce into said circuit a series of substantially compensating resistances, means connected with said lever and operated by the further movement of said lever in the same direction to cut out in succession some of said latter resistances, and means also operated by the movement of said lever in the same direction to introduce into the field-circuit in succession a series of resistances.

6. In combination, a plurality of armature-windings, means to connect the same in series, a series of resistances in the armature-circuit, contact-terminals for said resistances, connections, and a switch therefor, to throw said motors into parallel, a series of substantially compensating resistances, contact-terminals therefor, all of said terminals being arranged around a circle, a pivoted controlling-lever adapted to move around said circle and provided with means to make electrical contact in succession with said terminals, means controlled by said lever to throw said switch and at the same time introduce said compensating resistances into said armature-circuit, and a hand-lever connected with said controlling-lever to move the same over said terminals by a movement of said hand-lever in one direction.

7. In combination, a plurality of armature-windings, means to connect the same in series, a series of resistances in the armature-circuit, contact-terminals for said resistances, connections, and a switch therefor, to throw said windings into parallel, a series of substantially compensating resistances, contact-terminals therefor, all of said terminals being arranged around a circle, a pivoted controlling-lever adapted to move around said circle and provided with means to make electrical contact in succession with said terminals, means, controlled by said lever to throw said switch and at the same time introduce said compensating resistances into said armature-circuit, including a pair of oppositely-disposed electromagnets, a circuit for each, and means to automatically close said magnet-circuits alternately, and a hand-lever connected with said controlling-lever to move the same over said terminals by a movement of said hand-lever in one direction.

8. In combination, a plurality of armature-windings, a hand-lever, means operated by a movement of said lever in one direction to connect said windings in parallel and at the same time introduce into the armature-circuit a series of substantially compensating resistances, and, by a further movement of said hand-lever in the same direction, to cut said resistances out in succession, means controlled by said lever and adapted, on the movement of said lever in the reverse direction, to introduce into said armature-circuit in succession some of said resistances, and means controlled by said hand-lever and operated by a further movement of the same in said reverse direction to throw said windings back from parallel into series.

9. In combination, a plurality of armature-windings, a hand-lever, means operated by a movement of said lever in one direction to connect said windings in parallel and at the same time introduce into the armature-circuit a series of substantially compensating resistances, and, by a further movement of said hand-lever in the same direction, to cut said resistances out in succession, means controlled by said lever and adapted, on the movement of said lever in the reverse direction, to introduce into said armature-circuit in succession some of said resistances, and means controlled by said hand-lever and operated by a further movement of the same in said reverse direction to open said armature-circuit.

10. In combination, a plurality of armature-windings, a hand-lever, means operated by a movement of said lever in one direction to connect said windings in parallel and at the same time introduce into the armature-circuit a series of substantially compensating resistances, and, by a further movement of said hand-lever in the same direction, to cut said resistances out in succession, means controlled by said lever and adapted, on the movement of said lever in the reverse direction, to introduce into said armature-circuit in succession some of said resistances, and means controlled by said hand-lever and operated by a further movement of the same in said reverse direction to open said armature-circuit, and at the same time throw said windings back from parallel into series.

11. In combination, an electromagnet, means to energize the same, an armature for said magnet adapted to be moved by said magnet when the same is energized, an abutment moved by said armature, a movable switch-lever having a part connected with said armature adapted to move said lever and standing in the path of movement of said abutment, said abutment being normally separated from said part connected with said lever whereby said abutment strikes a quick hammer-blow to throw said switch-lever when said magnet is energized.

12. In combination, a solenoid, means to energize the same, a core for said solenoid adapted to be moved into the same when said solenoid is energized, an abutment on said core, a movable switch-lever having a part connected with said core adapted to move said lever and standing in the path of movement of said abutment, said abutment being normally separated from said part connected with said lever whereby said abutment strikes a quick hammer-blow to throw said switch-lever when said solenoid is energized.

13. In combination, a solenoid, a core for said solenoid adapted to be moved into the same when said solenoid is energized, said core having a slot therein, a movable switch-lever having a part connected therewith located in said slot, said part being adapted to move said lever and standing in the path of movement of the ends of said slot, one end of said slot being normally separated from said part connected with said lever whereby the end of said slot strikes a quick hammer-blow to throw said switch-lever when said solenoid is energized.

14. In combination, a solenoid, a core for said solenoid adapted to be moved into the same when said solenoid is energized, said core having a slot therein, a movable switch-lever having a part connected therewith located in the slot, said part standing in the path of movement of the ends of said slot and adapted to move said lever, one end of said slot being normally separated from said part connected with said lever whereby said end of said slot strikes a quick hammer-blow to throw said switch-lever when said solenoid is energized, and an auxiliary core within said solenoid to increase the initial effect of the same upon said movable core.

15. In combination, a solenoid, a movable core located partly within and movable into said solenoid when the same is energized, and an auxiliary loosely-movable core also within said solenoid but normally separated from said movable core and operating to increase the initial magnetic effect of said solenoid on said movable core.

16. In combination, a solenoid, a movable core located partly within and movable into said solenoid when the same is energized, an auxiliary movable core also within said solenoid but normally separated from said first core, said auxiliary core being moved toward said first core when said solenoid is energized and operating to increase the initial magnetic effect of said solenoid on said first core.

17. In combination, a solenoid, a movable core located partly within and movable into said solenoid when the same is energized, and an auxiliary movable core also within said solenoid but normally separated from said first core and operating to increase the initial magnetic effect of said solenoid on said first core, said auxiliary core adapted to be moved by said first movable core.

18. In combination a pair of oppositely-disposed solenoids, a movable core between said solenoids and adapted to enter the same alternately, a normally-open electric circuit through each solenoid, a contact-block to which the source of electricity is connected and a switch-lever in each of said solenoid-circuits adapted to alternately make connection with said contact-block, manually-controlled means to close said solenoid-circuits alternately, and means, operated on the movement of said core, to automatically move the switch-lever in the closed solenoid-circuit out of connection with said contact-block, thereby breaking said closed solenoid-circuit, and move the other lever into connection with said contact-block while its solenoid-circuit remains open.

19. In combination, a pair of oppositely-disposed solenoids, a movable core between said solenoids and adapted to enter the same alternately, a pair of electric circuits, each circuit including as a part thereof one of said solenoids, each of said circuits being normally open, manually-operated means to close said circuits alternately, and means automatically operated on the movement of said core to open the circuit so closed.

20. In combination, a switch, a pair of oppositely-disposed solenoids, a movable core between said solenoids and adapted to enter the same alternately, a connection between said switch and core, a circuit through each solenoid, a pair of switches to automatically close said circuits through said solenoids alternately and thereby move said core and also throw said switch, and means operated by said core to automatically open the switch in the closed solenoid-circuit on the movement of said core and consisting of a lever connected with said core and adapted to contact with said solenoid-switches.

21. In combination, a switch having a blade, a spring-jaw circuit-terminal engaged by said blade, a pair of oppositely-disposed solenoids, a movable core between said solenoids and adapted to enter the same alternately, a connection between said switch and core, a circuit through each solenoid, means to automatically close said circuits through said solenoids alternately and thereby move said core and throw said switch-blade out of said spring-jaw, and means to automatically open the closed solenoid-circuit during the movement of said core and after said blade leaves said terminal.

22. In combination, a plurality of armature-windings on the same shaft, a hand-lever, means operated by the movement of said lever in one direction to connect said windings in series, a series of resistances in the armature-circuit, means connected with said lever and adapted on the movement of said lever in one direction to cut out in succession some of said resistances, a switch connected with said lever and operated by a further movement of said lever in the same direction to throw said windings into parallel and at the same time introduce into said circuit a series of substantially compensating resistances, and means connected with said lever and operated by a further movement of said lever in the same direction to cut out in succession some of said latter resistances.

23. In combination, a plurality of armature-windings on the same shaft, means to connect the same in series, a hand-lever, a series of resistances in the armature-circuit, means connected with said lever and adapted on the movement of said lever in one direction to cut out in succession some of said resistances, means operated by the further movement of said lever in the same direction to reduce the strength of the field, a switch connected with said lever and operated by a further movement of said lever in the same direction to throw said windings into parallel and at the same time introduce into said circuit a series of substantially compensating resistances, and means connected with said lever and operated by a further movement of said lever in the same direction to cut out in succession some of said latter resistances.

24. In combination, a switch-blade having an aperture, a lever carrying the same, a pin on said lever entering said aperture in said blade, insulation on said pin and between it and said blade, and a sleeve surrounding said pin and insulation and located between said insulation and blade to distribute the blow from said blade.

25. In combination, a switch-blade having an aperture, a lever carrying the same, a pin on said lever entering said aperture in said blade, an insulated cushion on said pin and between it and said blade and a sleeve surrounding said pin and cushion and between said cushion and blade to distribute the blow from said blade, said blade being insulated from said lever.

26. In combination, a printing-press, a plurality of armature-windings, suitable circuits and a switch controlling the same to throw said windings from parallel to series connection, a second switch to open the armature-circuit, an electromagnet to actuate each switch, a plurality of emergency-switches located at different points around said printing-press, and connections from the circuits through said electromagnets to the terminals of each of said emergency-switches to energize both of said magnets at the same time.

27. In combination, a printing-press, a plurality of armature-windings, suitable circuits and a switch controlling the same to throw said windings from parallel to series connection, a second switch to open the armature-circuit, an electromagnet to actuate each switch, a plurality of emergency push-switches located in the floor at different points around said printing-press, and connections from the circuits through said electromagnets to the terminals of each of said emergency-switches to energize both of said magnets at the same time.

28. In combination, an electromotor, a switch to open a field-circuit of said motor, a safety resistance, a short circuit through said resistance for said field-circuit, a spring-pressed switch adapted to be released and close said short circuit when said field-circuit switch is opened.

29. In combination, an electromotor, a switch to open a field-circuit of said motor, a safety resistance, a short circuit through said resistance for said field-circuit, a spring-pressed switch resting against said first switch and adapted to be released and close said short circuit when said field-circuit switch is opened.

30. In combination, a plurality of armature-windings, means to connect the same in series, a series of resistances in the armature-circuit, contact-terminals for said resistances, connections, and a switch therefor, to throw said motors into parallel, a series of substantially compensating resistances, contact-terminals therefor, all of said terminals being arranged in succession, an arm adapted to move over said terminals and provided with means to make electrical contact in succession with the same, means controlled by said arm to throw said switch and at the same time introduce said compensating resistances into said armature-circuit, and a hand-lever connected with said controlling-arm to move the same over said terminals by a movement of said hand-lever in one direction.

31. In combination, a plurality of armature-windings on the same shaft, a hand-lever, means operated by a movement of said lever in one direction to connect said windings in parallel and at the same time introduce into the armature-circuit a series of substantially compensating resistances, and, by a further movement of said hand-lever in the same direction, to cut said resistances out in succession, means controlled by said lever and adapted, on the movement of said lever in the reverse direction, to introduce into said armature-circuit in succession some of said resistances, and means controlled by said hand-lever and operated by a further movement of the same in said reverse direction to throw said windings back from parallel into series.

32. In combination, a plurality of armature-windings on the same shaft, a hand-lever, means operated by a movement of said lever in one direction to connect said windings in parallel and at the same time introduce into the armature-circuit a series of substantially compensating resistances, and, by a further movement of said hand-lever in the same direction, to cut said resistances out in succession, means controlled by said lever and adapted, on the movement of said lever in the reverse direction, to introduce into said armature-circuit in succession some of said resistances, and means controlled by said hand-lever and operated by a further movement of the same in said reverse direction to open said armature-circuit.

33. In combination, a switch, a pair of solenoids, a part moved by said solenoids alternately and in opposite directions, a connection between said switch and said movable part, a normally-open circuit through each solenoid, means to automatically close said circuits through said solenoids alternately and thereby move said part and throw said switch, and means operated by the movement of said part to automatically open the closed solenoid-circuit without closing the other solenoid-circuit.

Signed at Westfield, New Jersey, this 29th day of March, 1900.

WILLIAM BREWSTER ELLIOTT,
JOHN WILLIAM ESKHOLME.

Witnesses:
C. H. FLORANDIZ,
R. V. MARR.